United States Patent [19]

Peeters

[11] Patent Number: 5,365,522

[45] Date of Patent: Nov. 15, 1994

[54] SWITCHING NETWORK

[75] Inventor: Hugo J. P. Peeters, Brasschaat,

[73] Assignee: Alcatel, N.V., Amsterdam, Netherlands

[21] Appl. No.: 68,387

[22] Filed: May 28, 1993

[30] Foreign Application Priority Data

Jun. 1, 1992 [EP] European Pat. Off. ........ 92201552.4

[51] Int. Cl.⁵ ........................................... H04L 12/56
[52] U.S. Cl. ...................................... 370/60.1; 370/60
[58] Field of Search ........................ 370/60.1, 60, 94.1, 370/16; 340/827, 825.03; 371/11.1, 11.2, 8.1, 8.2

[56] References Cited

U.S. PATENT DOCUMENTS 4,858,224 8/1989 Nakano et al. ...................... 370/16
5,153,578 10/1992 Izawa et al. ...................... 370/60.1

*Primary Examiner*—Douglas W. Olms
*Assistant Examiner*—Dang Ton
*Attorney, Agent, or Firm*—Ware, Fressola, Van Der Sluys & Adolphson

[57] ABSTRACT

The switching network (SN) includes a plurality of intercoupled switching units (SU) and a communication path (VP) established by a path set up cell (PSUC). In the switching units (SU) the communication path is routed through the cell marked with a first tag (ID) included in the path set up cell (PSUC), thereby providing the possibility for a second communication path to be set up later by a second path set up cell including a second tag (ID, DISL1) with the same value as the first tag (ID), in such a way that it does not cross the first mentioned communication path (VP) or that it crosses it at most a predetermined number of times, as indicated by a counter (CO, C1) also included in the second path set up cell.

19 Claims, 1 Drawing Sheet

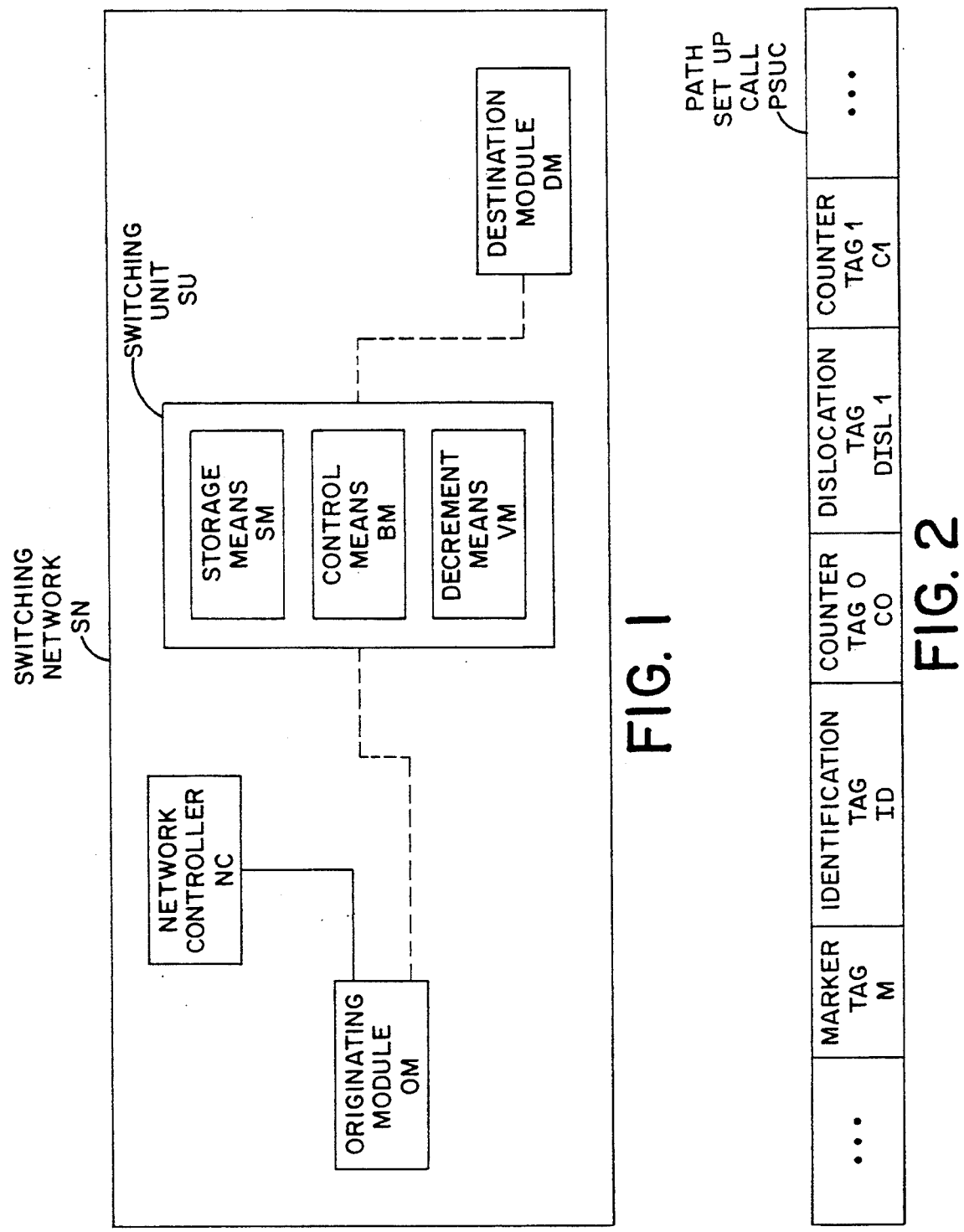

SWITCHING NETWORK

TECHNICAL FIELD

The present invention relates to a switching network including a plurality of intercoupled switching units through which at least a first communication path for at least a first cell stream is established by a first path set up cell transmitted prior to the transmission of the cells of said first cell stream on said first communication path which includes a first switching unit.

1. Background of the Invention

Such a switching network is already known in the art, and is described e.g. in the article "Distributed connection control and maintenance for an ATM multistage interconnection network", ICC, Denver, '91, by P. Barri and G. De Smet pp 692–698.

2. Summary of the Invention

Herein a switching network composed of switching units arranged in a distribution network randomizing traffic, and a routing network routing the traffic to its respective destination is described. A communication path in the above article referred to as a virtual path, for a cell stream to be routed through, is set up in the switching network in the following way.

If a virtual path is to be set up from an originating module connected to the distribution network, to a destination module connected to the routing network, first a path set up cell is launched by the originating module. If the latter cell is inhibited to pass a switching unit, a so-called blocked cell is returned by the latter unit to the originating module tearing down the already established part of the virtual path. At the originating module, a new path set up cell is launched, which due to present randomization in the distribution network, mostly follows a different path through the switching network. When the path set up cell arrives in the destination module, a confirmation cell is returned by the latter module to the originating module via the virtual path as logged by the path set up cell. After reception of the confirmation cell by the originating module, the cell stream is transmitted on the virtual path. At the end of the cell stream a clear explorer cell is sent by the originating module to release the virtual path. When the clear explorer cell is received by the destination module, it returns a clear cell tearing down the virtual path.

When another virtual path is to be set up in the switching network, it is not affected by already established and still existing virtual paths in the network, except when the combined bandwidth of cell streams routed through a given switching unit via a given outlet thereof, becomes too high.

OBJECTS OF THE INVENTION

An object of the invention is to provide a switching network of the above type but where the establishment of a second virtual path through a switching unit can be made dependent on a first virtual path already established through that switching unit.

This object is achieved due to the fact that at least a second of said switching units includes decision means to decide on the basis of a first tag associated to said first path set up cell and a second tag associated to a second path set up cell received in said second switching unit whether a second communication path is allowed to be established through said first switching unit by said second path set up cell.

In this way the decision for the second communication path to be established through the first switching unit is made dependent on whether the first communication path is established therethrough or not.

Another feature of the invention is that said first and said second switching unit are constituted by a single switching unit.

In this way the decision for the second communication path to be established through the first switching unit is taken in the first switching unit itself.

A further feature of the invention is that said decision consists in inhibiting said second communication path to be established through said first switching unit if said second tag has a predetermined relation with said first tag.

Thereby, the second communication path to be established can be inhibited to cross the first communication path.

Yet another feature of the invention is that said decision consists in allowing said second communication path to be established through maximally a predetermined number of said first switching units for which said second tag has a predetermined relation with said first tag.

In this way, the second communication path to be established can be forced to cross the first communication path for maximally said predetermined number of times.

Still another feature of the invention is that said path set up cell has an associated marker tag and an associated identifier tag constituting either said first tag or said second tag depending on the value of said marker tag.

Thereby, when the marker tag indicates that the identifier tag constitutes said first tag, the path set up cell establishes a first communication path depending on which a second communication path can be established later. When the identifier tag constitutes said second tag, the path set up cell is used for establishing a second communication path depending on a previously established first communication path.

Still a further feature of the invention is that said associated marker tag indicates whether said identifier tag, when constituting said first tag, at the same time constitutes said second tag or not.

In this way, the identifier tag constitutes said first tag, i.e. the path set up cell establishes a communication path depending on which a future communication path can be established later. At the sane time the identifier tag may constitute said second tag, which means the former communication path is established depending on an already established communication path.

Another characteristic of the invention is that said path set up cell has at least two associated second tags.

Thereby, the second communication path can be established depending on more than one previously established communication path.

Yet another characteristic of tile invention is that said path set up cell has at least one associated counter tag, referring to a group of second tags and indicating said predetermined maximum number of said first switching units for which a second tag of said group has said predetermined relation with said first tag.

In this way, the counter tag indicates the maximum number of crossings of the second communication path with any first communication path previously established by a path set up cell with an associated first tag having said predetermined relation with one of the tags of the group of second tags to which the counter tag refers.

To be noted that all possible groupings can be implemented. Two specific implementations are that there are as many groups as second tags, each group consisting of one second tag, and, secondly, that there is only one group consisting of all the second tags.

A further characteristic of the invention is that each of said switching units including said decision means furthermore includes decrementing means for decrementing said counter tag by one for each of said first switching units through which said second communication path is established and for which said second tag has said predetermined relation with said first tag.

Thereby the counter tags indicate at each instant of establishment of the second communication path how much crossings between the second path and the first communication path are henceforth maximally allowed.

Still a further characteristic of the invention is that said first switching unit furthermore includes storage means for storing said first tag.

As a result the first tag can be stored when the first communication path is established through the first switching unit.

Still another characteristic of the invention is that data transmitted on said first communication path established by said first path set up cell and data transmitted on said second communication path established by said second path set up cell, constitute the same information.

In this way, a fault tolerant double path for information to be routed through the switching network is established. Thereby, the information can still reach its destination when one of the communication paths is blocked due to e.g. a broken link or a defect switching unit.

Still another characteristic of the invention is that said switching network includes a network controller for assigning said tags to said path set up cells.

Thereby, different tags can be associated with different paths to be established.

A last characteristic of the invention is that if said second tag has a predetermined default value, it is ignored for said decision.

In this way, when the decision tag has the default value, the communication path is set up as in the prior art, i.e. without considering paths already established in the switching network.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIG. 1 shows a switching network SN according to the invention;

FIG. 2 shows a path set up cell PSUC for setting up a virtual path in the switching network SN of FIG. 1.

BEST MODE FOR CARRYING OUT THE INVENTION

The switching network SN of FIG. 1 includes a (not shown) distribution network and a (not shown) routing network. Both the distribution and the routing network are built from identical switching units, of which one, viz. SU, is shown. SU includes a decision means BM, a storage SM, and a decrementing means VM. Originating modules, one of which, viz. OM, is shown, are connected to the distribution network and destination modules, one of which, viz. DM, is shown, are connected to the routing network. The switching network SN furthermore includes a network controller NC which is connected to each originating module.

A cell stream is routed from the originating module OM to the destination module DM via a communication path, henceforth referred to as virtual path VP, the setting up of which is randomized in the distribution network, i.e. an arbitrary path is chosen there, and then the cell stream is routed in the routing network to the destination module DM via a unique path. Such a network and such routing is already described in the above mentioned article "Distributed connection control and maintenance for an ATM multistage interconnection network", ICC, Denver, '91. by P. Barri and G. De Smet pp 692-698.

The path set up cell PSUC represented in FIG. 2 is used to set up the above mentioned virtual path VP. It is built so as to provide the possibility for paths to be established in such a way that they do not cross predetermined previously established and still existing virtual paths or that they cross them for at most a predetermined number of times. To this end, the path set up cell PSUC includes a tag with which VP can be marked in the switching units it is routed through, and tags which in a switching unit SU can be compared to the tags marking virtual paths already established through SU.

As shown in FIG. 2, the path set up cell PSUC includes:

a 1-bit marker tag M, which is:
1 if the virtual path VP is to be marked in the switching units it is established through, so that after establishment of VP another virtual path not crossing the virtual path VP or crossing it maximally a predetermined number of times, can be set up as will be explained later;
0 if the virtual path VP is not to be marked in the switching units it is established through;
an identifier tag ID which:
if M=1, constitutes a first tag with which the switching units routing VP are to be marked; hence ID is stored by the storage means SM of the switching units SU through which the virtual path VP is established, and
if M=0, constitutes a second tag which is described further;
a counter tag CO, which:
if M=1, is not used, and
if M=0, has the same function as a counter tag accompanying a second tag and described further;
a second tag, henceforth referred to as dislocation tag DISL1, which:
if it is '0 . . . 0', is not considered, and
if not, indicates that the virtual path VP may, henceforth, be routed for at most a predetermined number of times through a switching unit SU in the storage means SM of which this dislocation tag DISL1 is registered, said number being indicated in
a counter tag C1, accompanying the dislocation tag DISL1, and which is also not considered if DISL1='0 . . . 0'.

In the present example, only one second tag is considered. However, more second tags can be considered which are then grouped in one or more sets. To each set a counter tag is associated indicating the maximum number of crossings allowed for the virtual path VP with other virtual paths established by another path set up cell with an associated first tag, i.e. identifier tag ID with M=1, which is a member of the considered set. It is to be noted that, e.g., each second tag can form a set or that, e.g., there might be only one set including all second tags.

With the above structure of the path set up cell PSUC the following use is made of the identifier tag ID:

if M=1: the identifier tag ID is stored by the storage means SM of the switching units SU through which the virtual path VP is established, unless ID equals '0 . . . 0' in which case it is not stored; it is however not compared with second tags already stored by the latter storage means SM.

if M=0: the identifier tag ID is not stored by the latter storage means SM; when the identifier tag ID does not equal '0 . . . 0' it is compared with the first tags already stored by the latter storage means SM, in order to decide on the allowability of the virtual path VP to be established through the latter switching unit SU; when the identifier tag ID equals '0 . . . 0', this comparation is not performed.

Thereby, the same identifier tag ID can not be used for storing combined with comparing. This can be remedied by using a 2-bit marker tag M, the first bit of which has the same function as the above 1-bit marker tag, i.e. M=0 means no storing, whereas M=1 means storing. The second bit indicates whether the above comparison is to be done or not, i.e. e.g. 0 means no comparison is to be performed, whereas 1 means the opposite. This structure is not considered further, but the operation of the switching network SN is analoguous to the operation for the former structure, as described further.

It is to be noted that when second tags are considered, also for the structure with the 2-bit marker tag M an exception is to be made for a default value of ID, in the above example '0 . . . 0', which causes the above comparison or storage not to occur. This is due to the fact that both first and second tags have to be able to indicate the same values and that for the second tags a default value is always considered. If the above exception were not made, a first tag having said default value would be registered in switching units SU although a second tag having said default value would never be compared to it. Hence, a match would never occur in such a case. When no second tags are considered, no such exception has to be made.

The operation of the switching network for a path set up cell PSUC as given in FIG. 2 is as follows.

If a virtual path VP is to be established in the switching network SN from an originating module OM to a destination module DM, a path set up cell PSUC is launched in the originating module OM where the values of the elements M, ID, CO, DISL1 and C1 are assigned to the path set up cell PSUC by a network controller NC. In each switching unit SU that the path set up cell PSUC arrives in, the marker tag M is checked to see whether the virtual path VP is to be marked in the switching element or not.

Hereafter, two different path set up cells PSUC will be considered, first one where the marker tag M=1 and then another where the marker tag M=0.

In the first path set up cell PSUC, the elements mentioned above are filled in as follows:
M=1;
ID=color1, where color1 is a first predetermined binary number;
CO=0;
DISL1=color2, where color2 is a second predetermined binary number;
C1=0.

When this path set up cell PSUC arrives in the switching unit SU, the marker tag M is checked. Since M=1, the contents of the identifier tag ID, i.e. color1, is to be stored in the storage means SM of the switching unit SU, if the virtual path VP is routed through this switching unit SU.

To decide this, first the storage means SM of the switching unit SU is checked for the contents of the dislocation tag DISL1, i.e. for color2, unless when color2='0 . . . 0'. If color2 is not found in the storage means SM or if it is '0 . . . 0', then the virtual path VP may be routed through the switching unit SU. If color2 is found in the storage means SM, then the counter tag C1 is checked.

If C1 is different from zero, i.e. if it is strictly positive since negative numbers are not considered, then the virtual path VP is allowed to be routed through the switching unit SU and the counter tag C1 is decremented by 1.

If, however, the counter tag C1 is equal to zero, then the virtual path VP is not allowed to pass the switching unit SU. In that case, as in other cases in which the virtual path VP is not allowed to pass the switching unit SU, e.g. because there is not enough bandwidth available or because of a broken link, a blocked cell is returned to the originating module OM via the already established part of the virtual path VP. This blocked cell undoes all changes made by the path set up cell PSUC in the switching units SU, i.e. load counters included in the switching elements are corrected, and also the identifier tag ID registered by the storage means SM is cleared from the storage means SM.

When the blocked cell arrives at the originating module OM, a new path set up cell PSUC is launched, which due to the randomization in the distribution network will probably follow a virtual path VP different from the above one.

Another possibility is that the blocked cell is returned to the previous switching unit SU of the virtual path VP where a copy of the path set up cell PSUC was buffered. This copy can then be transmitted to another outlet of the switching unit SU, so that the path VP does not have to be reestablished from the originating module OM on. To this end, in each switching unit a copy of the path set up cell PSUC has to be buffered for some time after PSUC has been sent to the following switching unit.

It is to be noted that this solution is only applicable if the previous switching unit SU belongs to the distribution network and not to the routing network since there only a unique path exists.

Now, a second path set up cell PSUC is considered, for which:
M=0;
ID=color1;
CO=n, where n is a predetermined positive integer;
DISL1=0 . . . 0;
C1=1.

When this second path set up cell PSUC arrives in the switching unit SU, the marker tag M is checked. Since M=0, the identifier tag ID is considered to be a second tag, as is the dislocation tag DISL1. Hence, in order to decide whether the second path set up cell PSUC may be routed through the switching unit SU, the storage means SM of SU is checked for the contents of ID, i.e.

for color1. Since the contents of DISL1 is '0 . . . 0', this dislocation field is not considered. If 'color1' is found in the storage means SM and the counter tag CO contains an integer different from zero, and if no other objections against the second path set up cell PSUC passing the switching unit SU are present (enough bandwidth available, no broken link), then the counter tag CO is decremented by 1, and consequently it then contains the integer n−1. If the contents of the counter tag CO is zero, then the second path set up cell PSUC is inhibited from passing the switching unit SU. A blocked cell is then returned to the originating module tearing down the already established part of the virtual path, and a new path set up cell is launched. Another possibility is again to return the blocked cell only to the previous switching unit SU as described above.

When a path set up cell PSUC arrives at the destination module DM, a confirmation cell is returned to the originating module OM, after which the cells of the cell stream can be sent through.

At the end of the cell stream a clear explorer cell is launched by the originating module OM. As this arrives at the destination module DN via the virtual path VP, a clear cell is sent back by the latter module, tearing down the virtual path VP, i.e. the load counters are corrected and for the virtual path as set up by the first path set up cell described above, the identifier tag ID is cleared from the storage means SM of the switching units SU composing the path VP. Also the clearing is communicated to the network controller NC, so that the identifier tag ID can be re-used to mark a new virtual path.

It is to be noted that by establishing two different virtual paths not crossing each other or crossing each other for at most a predetermined number of times as described above, a fault tolerant double interconnection between an originating and a destination module for data to be transmitted via, can be set up. When the data is transmitted simultaneously on both paths, and to one and the same destination module, a selection means—not discussed here, since it is no part of the invention—selecting one of both data streams is to be included where both paths come together since otherwise the data, arriving more than once, could be misinterpreted. Such selection means is not needed when e.g. the second path is kept in standby to route the data stream only when the first path is blocked. It is also not needed when the data is routed to different destination modules.

Based on the above functional description, it is obvious for a person skilled in the art to realize a network such as SN. It is therefore not described in further detail.

While the principles of the invention have been described above in connection with specific apparatus, it is to be clearly understood that this description is made only by way of example and not as a limitation on the scope of the invention.

I claim:

1. A switching network (SN) including a plurality of intercoupled switching units (SU) having first switching units (SU) through which at least a first communication path (VP) is established for at least one cell stream by control information in a first path set up cell (PSUC) transmitted prior to the transmission of data cells of said at least one cell stream on said first communication path (VP), characterized in that said plurality of intercoupled switching unit includes a second switching unit (SU) having control means (BM) for determining on the basis of a first tag (ID) associated with said first path set up cell (PSUC) and a second tag (ID, DISL1) associated with a second path set up cell (PSUC) received in said second switching unit (SU) whether a second communication path (VP) is established through said first switching units (SU) by said second path set up cell (PSUC).

2. A switching network (SN) according to claim 1, characterized in that said first and said second switching units are constituted by a single switching unit (SU).

3. A switching network (SN) according to claim 1, characterized in that said control means prevents said second communication path (VP) from being established through said first switching unit (SU) if said second tag (ID, DISL1) has a predetermined logical relation with said first tag (ID), such as both being equal to the logical value of either "0" or "1".

4. A switching network (SN) according to claim 1, characterized in that said control means allows said second communication path (VP) to be established for a plurality of said first switching units (SU) which each have said second tag (ID, DISL1) with a predetermined logical relation with said first tag (ID), such as both being equal to the logical value of either "0" or "1".

5. A switching network (SN) according to claim 4, characterized in that said second path set up cell (PSUC) has at least one associated counter tag (CO, C1) for indicating a predetermined number of said first switching units (SU) which each have said second tag (ID, DISL1) in a predetermined logical relation with said first tag (ID).

6. A switching network (SN) according to claim 1, characterized in that said first path set up cell (PSUC) and said second path set up cell (PSUC) each have a respective marker tag (M) and a respective identifier tag (ID) constituting either said first tag (ID) or said second tag (ID, DISL1) depending on the value of said respective marker tag (M).

7. A switching network (SN) according to claim 6, characterized in that said respective marker tag (M) indicates whether said respective identifier tag (ID) constitutes either said first tag (ID) or constitutes said first tag (ID) and said second tag (ID, DISL1).

8. A switching network (SN) according to claim 1, characterized in that each of said first and second path set up cell (PSUC) has at least two respective second tags (ID, DISL1).

9. A switching network (SN) according to claim 8, characterized in that each of said first and second path set up cell (PSUC) has at least one respective counter tag (CO, C1), which refers to a group of second tags (ID, DISL1) and indicates the number of said first switching units (SU) for which a second tag (ID, DISL1) has said predetermined logical relation with said first tag (ID).

10. A switching network (SN) according to claim 9, characterized in that each of said plurality of intercoupled switching units (SU) having said control means (BM) furthermore includes decrementing means (VM) for decrementing said counter tag (CO, C1) by one in each first switching units (SU) through which said second communication path (VP) is established and for which said second tag (ID, DISL1) has said predetermined relation with said first tag (ID).

11. A switching network (SN) according to claim 1, characterized in that said first switching unit (SU) furthermore includes storage means (SM) for storing said first tag (ID).

12. A switching network (SN) according to claim 1, characterized in that data transmitted on said first communication path (VP) established by said first path set up cell (PSUC) and data transmitted on said second communication path (VP) established by said second path set up cell (PSUC), constitute the same information.

13. A switching network (SN) according to claim 9, characterized in that switching network (SN) further includes a network controller (NC) for assigning a plurality of tags (M, ID, CO, DISL1, C1) to said respective first and second path set up cells (PSUC).

14. A switching network (SN) according to claim 1, characterized in that said control means (DM) ignores said second tag (ID, DISL1) if it has a predetermined logical default value.

15. A switching network (SN) according to claim 4, characterized in that each of said first and path set up cell (PSUC) has at least one respective counter tag (CO, C1), which refers to a group of second tags (ID, DISL1) and indicates the number of said first switching units (SU) for which a second tag (ID, DISL1) has said predetermined logical relation with said first tag (ID).

16. A switching network (SN) according to claim 5, characterized in that each of said first and second path set up cell (PSUC) has at least one respective counter tag (CO, C1), which refers to a group of second tags (ID, DISL1) and indicates the number of said first switching units (SU) for which a second tag (ID, DISL1) has said predetermined logical relation with said first tag (ID).

17. A switching network (SN) according to claim 1, characterized in that switching network (SN) further includes a network controller (NC) for assigning a plurality of tags (M, ID, CO, DISL1, C1) to said respective first and second path set up cells (PSUC).

18. A switching network (SN) according to claim 6, characterized in that switching network (SN) further includes a network controller (NC) for assigning a plurality of tags (M, ID, CO, DISL1, C1) to said respective first and second path set up cells (PSUC).

19. A switching network (SN) according to claim 8, characterized in that switching network (SN) further includes a network controller (NC) for assigning a plurality of tags (M, ID, CO, DISL1, C1) to said respective first and second path set up cells (PSUC).

* * * * *